US006665732B1

United States Patent
Garofalakis et al.

(10) Patent No.: US 6,665,732 B1
(45) Date of Patent: Dec. 16, 2003

(54) METHOD AND SYSTEM FOR RESOURCE SCHEDULING COMPOSITE MULTIMEDIA OBJECTS

(75) Inventors: Minos N. Garofalakis, Madison, WI (US); Yannis E. Ioannidis, Athens (GR); Banu Ozden, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/138,338

(22) Filed: Aug. 21, 1998

(51) Int. Cl.[7] ............................................. G06F 15/16
(52) U.S. Cl. ..................... 709/247; 709/231; 709/232; 709/233
(58) Field of Search ................................ 709/231, 230, 709/232, 233, 105, 242, 246, 247; 370/235, 498, 537, 538, 467, 468; 341/59, 60, 88

(56) References Cited

U.S. PATENT DOCUMENTS

| | | | |
|---|---|---|---|
| 5,694,334 A | * 12/1997 | Donahue et al. | 709/247 |
| 5,734,677 A | * 3/1998 | Liew et al. | 370/477 |
| 5,754,783 A | * 5/1998 | Mendelson et al. | 709/217 |
| 5,793,980 A | * 8/1998 | Glaser et al. | 709/231 |
| 5,845,279 A | * 12/1998 | Garofalakis et al. | 707/7 |
| 5,995,091 A | * 11/1999 | Near et al. | 707/500.1 |
| 6,044,396 A | * 3/2000 | Adams | 370/538 |
| 6,052,384 A | * 4/2000 | Huang et al. | 370/468 |
| 6,219,704 B1 | * 4/2001 | Kim et al. | 709/232 |
| 6,272,658 B1 | * 8/2001 | Steele et al. | 370/474 |
| 6,330,609 B1 | * 12/2001 | Garofalakis et al. | 709/229 |
| 6,351,471 B1 | * 2/2002 | Robinett et al. | 370/468 |

OTHER PUBLICATIONS

Amihood Amir et al., *Chapter 24, Efficient 2–dimensional Approximate Matching of Non–rectangular Figures*, In Proceedings of the Second Annual ACM–SIAM Symposium on Discrete Algorithms, San Francisco, California, Jan. 1991, pp. 212–223.

Brenda S. Baker et al., *Shelf Algorithms For Two–Dimensional Packing Problems*, Siam J. Comput. vol. 12, No. 3, Aug. 1993, pp. 508–525.

Brenda S. Baker et al., *Orthogonal Packings in Two Dimensions*, Siam J. Comput, vol. 9, No. 4, Nov. 1980, pp. 846–855.

E. G. Coffman, Jr., et al., *Performance Bounds For Level–Oriented Two–Dimensional Packing Algorithms* Siam J.Comput, vol. 9, No. 4, Nov. 1980, pp. 808–826.

Surajit Chaudhuri et al., *Avoiding Retrieval Contention For Composite Multimedia Objects*, Proceedings of the 21st VLDB Conference, Zurich, Switzerland, 1995, pp. 287–298.

Soumen Chakrabarti et al., *Resource Scheduling For Parallel Database And Scientific Applications*, SPAA 1996, Padua, Italy, pp. 329–335.

K. Selcuk Candan et al., *Retrieval Schedules Based on Resource Availability And Flexible Presentation Specifications*, Technical Report CS–TR–3616, University of Maryland, College Park, 1996, pp. 1–30.

(List continued on next page.)

Primary Examiner—Marc D. Thompson

(57) ABSTRACT

A system for the effective resource scheduling of composite multimedia objects involves a sequence packing formulation of the composite object scheduling problem and associated efficient algorithms using techniques from pattern matching and multiprocessor scheduling. An associated method of scheduling the provision of composite multimedia objects, each comprising one or more continuous media streams of audio data, video data and other data, where the continuous media streams are of varying bandwidth requirement and duration comprise the steps of; generating composite multimedia objects from the continuous media streams and determining a run-length compressed form for each of the generated composite multimedia objects.

26 Claims, 7 Drawing Sheets

OTHER PUBLICATIONS

Soumen Chakrabarti et al., *Improved Scheduling Algorithms For Minsum Criteria*, In Proceedings of the 23rd International Coloquium on Automata, Languages, and Programming (ICALP '96), Paderborn, Germany, Jul. 1996 pp. 646–657.

M. R. Garey et al., *Bounds For Multiprocessor Scheduling With Resource Constraints*, Siam J. Comput, vol. 4, No. 2, Jun. 1975, pp. 187–200.

M. R. Garey et al., *Resource Constrained Scheduling As Generalized Bin Packing*, Journal Of Combinatorial Theory (A) 21, 1976, pp. 257–298.

Minos N. Garofalakis et al., *Parallel Query Scheduling And Optimization With Time –and Space–Shared Resources*, Proceedings of the 23rd VLDB Conference, Athens, Greece, Aug. 1997, pp. 296–305.

Leslie A. Hall et al., *Scheduling To Minimize Average Completion Time: Off–line and On–line Approximation Algorithms*, May 1996, revised Mar. 1997, pp. 1–32.

Banu Ozden et al., *A Low–Cost Storage Server For Movie On–Demand Databases*, In Proceedings of the 20th International Conference on VLDB, Sep. 1994, pp. 1–12.

Banu Ozden et al., *A Framework For the Storage And Retrieval Of Continuous Media Data*, In Proceedings of the 1995 International Conference on Multimedia Computing and Systems, Wshington, D.C., May 1995, pp. 2–13.

Roger Price, *MHEG: An Introduction To The Future International Standard For Hypermedia Object Interchange*, In Proceedings of ACM Multimedia '93, Anaheim, California, Aug. 1993, pp. 121–128.

Cyrus Shahabi et al., *On Scheduling Atomic And Composite Multimedia Objects*, Technical Report USC–CS–95–622, University of Southern California, 1995, pp. 1–35.

Heiko Thimm et al., *δ–Sets For Optimized Reactive Adaptive Playout Management in Distributed Multimedia Database Systems*, In Proceedings of the Twelfth International Conference on Data Engineering, New Orleans, Louisiana, Feb. 1996, pp. 1–9.

John Turek, et al., *Scheduling Parallelizable Tasks to Minimize Average Response Time*, SPAA 1994. Cape May, New Jersey, pp. 200–209.

John Turek et al., *Approximate Algorithms For Scheduling Parallelizable Tasks*, SPAA 1992, pp. 323–332.

\* cited by examiner

METHOD AND SYSTEM FOR RESOURCE SCHEDULING COMPOSITE MULTIMEDIA OBJECTS

TECHNICAL FIELD

This invention relates to the scheduling, within multimedia database servers, of resources for storing or transmitting composite multimedia objects that contain various forms of multimedia data such as images, video, and audio.

BACKGROUND OF THE INVENTION

Next generation database systems will need to provide support (for example, identify the storage (memory) and disk or transmission bandwidth requirements) for various forms of multimedia data such as images, video, and audio. These new data types differ from conventional alphanumeric data in their characteristics, and hence require different techniques for their organization and management. A fundamental issue is that digital video and audio streams consist of a sequence of media quanta (for example, video frames and audio samples) which convey meaning only when presented continuously in time. Hence, a multimedia database server needs to provide a guaranteed level of service for accessing such continuous media (CM streams in order to satisfy their pre-specified real-time delivery rates and ensure intra-media continuity. Given the limited amount of resources (for example, memory and disk or transmission bandwidth), it is a challenging problem to design effective resource scheduling algorithms that can provide on-demand support for a large number of concurrent continuous media clients.

An important requirement for multimedia database systems is the ability to dynamically compose new multimedia objects from an existing repository of CM streams. Temporal and spatial primitives specifying the relative timing and output layout of component CM streams provide perhaps the most powerful and natural method of authoring such composite multimedia presentations. Thus, to compose tailored multimedia presentations, a user might define temporal dependencies among multiple CM streams having various length and display bandwidth requirements. For example, a story for the evening news can start out by displaying a high resolution video clip with concurrent background music and narration added after an initial delay. After some time into the story, the video screen is split and a new video clip starts playing on the left half of the screen. After the second video clip ends, the narration stops and the story comes to a conclusion with the display of the first clip and the background music.

In the presence of such composite multimedia objects, a scheduling algorithm must ensure that the inter-media synchronization constraints defined by the temporal relationships among CM components are met. Handling these synchronization constraints requires a task model that is significantly more complex than the models employed in scheduling theory and practice. See, Soumen Chakrabarti and S. Muthukrishnan, "Resource Scheduling for Parallel Database and Scientific Applications", *Proceedings of the Eighth Annual ACM Symposium on Parallel Algorithms and Architectures*, pages 329–335, Padua, Italy, June 1996; M. R. Garey and R. L. Graham, "Bounds for Multiprocessor Scheduling with Resource Constraints", *SIAM Journal on Computing*, 4(2):187–200, June 1975; and M. R. Garey, R. L. Graham, D. S. Johnson, and Andrew Chi-Chih Yao, "Resource Constrained Scheduling as Generalized Bin Packing", *Journal of Combinatorial Theory* (A), 21:257–298, 1976. More specifically, composite multimedia objects essentially correspond to resource-constrained tasks with time-varying resource demands. Resource constraints come from the limited amount of server resources available to satisfy the requirements of CM streams and time-variability stems from the user-defined inter-media synchronization requirements. We believe that this is a task model that has not been previously studied in the context of deterministic scheduling theory. Furthermore, despite the obvious importance of the problem for multimedia database systems, our work appears to be the first systematic study of the problems involved in scheduling multiple composite multimedia objects. We suspect that this may be due to the difficulty of the problems, most of which are non-trivial generalizations of NP-hard optimization problems.

It appears that today's multimedia storage servers offer no clever scheduling support for composite multimedia presentations. The approach typically employed is to reserve server resources based on the maximum (that is, worst-case) resource demand over the duration of a composite presentation. Examples of systems using this worst-case resource reservation method include the Fellini and CineBlitz multimedia storage servers developed at Bell Laboratories and discussed in Cliff Martin, P. S. Narayanan, Banu Özden, Rajeev Rastogi, and Avi Silberschatz, "The Fellini Multimedia Storage Server", *Multimedia Information Storage and Management*, pages 117–146, (S. M. Chung ed., Kluwer Academic Publishers 1996); Starlight's StarWorks (http://www.starlight.com/); and Oracle's Media Server (http://www.oracle.com/). Conceptually, this approach is equivalent to identifying the resource requirements of the presentation over time with their enclosing Minimum Bounding Rectangle MBR). Although this simplification significantly reduces the complexity of the relevant scheduling problems, it suffers from two major deficiencies.

The volume (that is, resource-time product as in Chakrabarti et al. and in our Minos N. Garofalakis and Yannis E. Ioannidis, "Parallel Query Scheduling and Optimization with Time- and Space-Shared Resources", *Proceedings of the 23rd International Conference on Very Large Data Bases*, pages 296–305, Athens, Greece, August 1997. ) in the enclosing MBR can be significantly larger than the actual requirements of the composite object. This can result in wasting large fractions of precious server resources, especially for relatively "sparse" composite objects.

The MBR simplification "hides" the timing structure of individual streams from the scheduler, making it impossible to improve the performance of a schedule through clever use of memory buffers.

A number of conceptual models have been developed for capturing the temporal aspects of multimedia data. They can be roughly classified into three categories, namely: 1) graph-based models (for example, object composition petri nets as in Thomas D. C. Little and Arif Ghafoor, "Synchronization and Storage Models for Multimedia Objects", *IEEE Journal on Selected Areas in Communications*, 8 (3):413–427, April 1990 and presentation graphs as in Kingsley C. Nwosu, Bhavani Thuraisingham, and P. Bruce Berra, eds., *Multimedia Database Systems: Design and Implementation Strategies*, Kluwer Academic Publishers, 1996); 2) language-based models (for example, HyTime as in Steven R. Newcomb, Neill A. Kipp, and Victoria T. Newcomb, "The HyTime Hypermedia/Time-based Document Structuring Language", *Communications of the ACM*, 34 (11), November 1991 and MHEG as in R. Price, "MHEG: An Introduction to the Future International Standard for Hypermedia Object Interchange", *Proceedings of ACM Multimedia '93*, pages 121–128, Anaheim, Calif., August 1993.), and 3) temporal abstraction models (for example, temporal intervals and relations as in J. F. Allen, "Maintaining Knowledge About Temporal Intervals", *Communications of the ACM*, 26(11):832–843, November 1983, and Thomas D. C. Little and Arif Ghafoor, "Interval-Based Conceptual Models for Time-Dependent Multimedia Data", *IEEE Transactions on Knowledge and Data Engineering*, 5(4):551–563, August 1993). Candan et al. present a method based on linear difference constraints for defining flexible inter-media synchronization requirements and show how these constraints can be solved and/or modified to ensure consistency in K. Selcuk Candan, B. Prabhakaran and V. S. Subrahmanian, "Retrieval Schedules Based on Resource Availability and Flexible Presentation Specifications", Technical Report CS-TR-3616, University of Maryland, College Park, 1996. Thimm et al. describe a feedback-based architecture for adapting a multimedia presentation to the changes in resource availability by modifying the presentation quality in Heiko Thimm and Wolfgang Klas, "δ-Sets for Optimized Reactive Adaptive Playout Management in Distributed Multimedia Database Systems", *Proceedings of the Twelfth International Conference on Data Engineering*, pages 584–592, New Orleans, La., February 1996. In our earlier work, Minos N. Garofalakis and Yannis E. Ioannidis, "Scheduling Issues in Multimedia Query Optimization": *ACM Computing Surveys*, 27(4):590–592, December 1995 (Symposium on Multimedia), we present a scheduling framework for simple (independent) CM streams based on the resource-constrained list-scheduling methodology of Garey and Graham discussed above.

Articles which address some of the issues in scheduling composite multimedia objects include Surajit Chaudhuri, Shahram Ghandeharizadeh and Cyrus Shahabi, "Avoiding Retrieval Contention for Composite Multimedia Objects", *Proceedings of the 21st International Conference on Very Large Data Bases*, pages 287–298, Zurich, Switzerland, September 1995; and Cyrus Shahabi, Shahram Ghandeharizadeh and Surajit Chaudhuri, "On Scheduling Atomic and Composite Multimedia Objects", Technical Report USC-CS-95-622, University of Southern California, 1995, (to appear in *IEEE Transactions on Knowledge and Data Engineering*). However, their research on composite objects focuses on (1) using memory to resolve the problem of "internal contention", which occurs when the temporal synchronization constraints cause stream retrievals for a single object to collide; and, (2) developing heuristic memory management policies to distribute a fixed amount of server memory among multiple competing objects. More specifically, Chaudhuri et al. suggest a conservative and a greedy heuristic for allocating memory among multiple binary composite objects, under the assumption of regular, round-robin striping of component streams. However, extending their heuristics to general, n-ary objects appears to be problematic. Shahabi et al. show how these conservative and greedy methods can be adapted to the problem of resolving internal contention in a single n-ary composite object, again assuming round-robin layout. Although the authors outline some ideas on how to actually schedule multiple composite objects, they offer no concrete algorithmic solutions for the problem. Furthermore, their development is based on the assumption of a round-robin distribution of stream fragments across disks, whereas we assume a more abstract "black-box" model of server disk bandwidth.

Thus, there remains in the art a need to implement a composite multimedia object scheduling system that permits the efficient and reliable scheduling of the composite multimedia objects to ensure that the inter-media synchronization constraints between the CM streams are met.

SUMMARY OF THE INVENTION

We formulate resource scheduling problems for composite multimedia objects and develop novel efficient scheduling algorithms, drawing on a number of techniques from pattern matching and multiprocessor scheduling. Our formulation is based on a novel sequence packing problem, where the goal is to superimpose numeric sequences (representing the objects' resource needs as a function of time) within a fixed capacity bin (representing the server's resource capacity). We propose heuristic algorithms for the sequence packing problem using a two-step approach. First, we present a "basic step" method for packing two object sequences into a single, combined sequence. Second, we show how this basic step can be employed within different scheduling heuristics to obtain a playout schedule for multiple composite objects. More specifically, we examine greedy scheduling heuristics based on the general list-scheduling (LS) methodology of Graham in R. L. Graham, "Bounds on Multiprocessing Timing Anomalies", *SIAM Journal on Computing*, 17(2):416–429, March 1969; and in Garey and Graham. We show that although LS schemes are provably near-optimal for packing monotonic sequences, they can have poor worst-case performance when the monotonicity assumption is violated. A "monotonic" sequence is a sequence in which the bandwidth requirement of the sequence can either increase or decrease over time, but it can not do both. Based on this result, we propose: (1) inventive methods for improving the behavior of simple LS through the use of extra memory buffers; and, (2) a novel family of more clever scheduling algorithms, termed list-scheduling with backtracking (LSB), that try to improve upon simple LS by occasional local improvements to the schedule.

Results with randomly generated composite objects show that our LS strategy offers excellent average-case performance compared to both an MBR-based approach and the optimal solution. Finally, we show how the idea of stream sharing can be exploited to improve the quality of a schedule. "Stream sharing" occurs when we allow several presentations to share component streams from separate composite objects.

Although our invention is primarily geared towards composite objects, our task model also exactly captures the problem of scheduling the retrievals of variable bit rate streams, that is, CM streams whose bandwidth requirements can vary over time. This is a very important application of our scheduling framework, since real-life CM data is nearly always variable rate.

Therefore, there is a need for our inventive method of scheduling the provision of composite multimedia objects, each comprising one or more continuous media streams of audio data, video data and other data, where the continuous media streams are of varying bandwidth requirement and duration; generating composite multimedia objects from the continuous media streams; and determining a run-length compressed form for each of the generated composite multimedia objects. Where the other data can be still images (for example, photographs), other images (for example, graphic and scanned images), animations, text, and program code data files)

Other advantages and features of the present invention will be understood from studying FIGS. 1–12 and the detailed description of a preferred embodiment.

DETAILED DESCRIPTION

A composite multimedia object consists of multiple continuous media (CM) streams tied together through spatial and temporal primitives. "Continuous media streams" are digital video and audio streams that consist of a sequence of media quanta (for example, video frames and audio samples) which convey meaning only when presented continuously in time. Since the spatial layout of the output is predetermined by the user and does not affect the resource bandwidth requirements of CM streams, we concentrate on the temporal aspects of CM composition. Following the bulk of the multimedia systems literature, we also concentrate on the server disk bandwidth resource which is typically the bottleneck for multimedia applications. To simplify the presentation, we assume that the stream resource demands have been normalized to [0,1] using the aggregate disk bandwidth of the server B.

We also assume that the time scale is discrete so that both the lengths of CM streams and their lag parameters have integer values. This is usually the case in practice, since most multimedia storage servers employ a round-based data retrieval scheme and thus timing can only be specified at the granularity of a round's length, which is typically very small (a few seconds). Of course, finer-grain synchronization can always be implemented using extra memory buffering.

Figure 1:
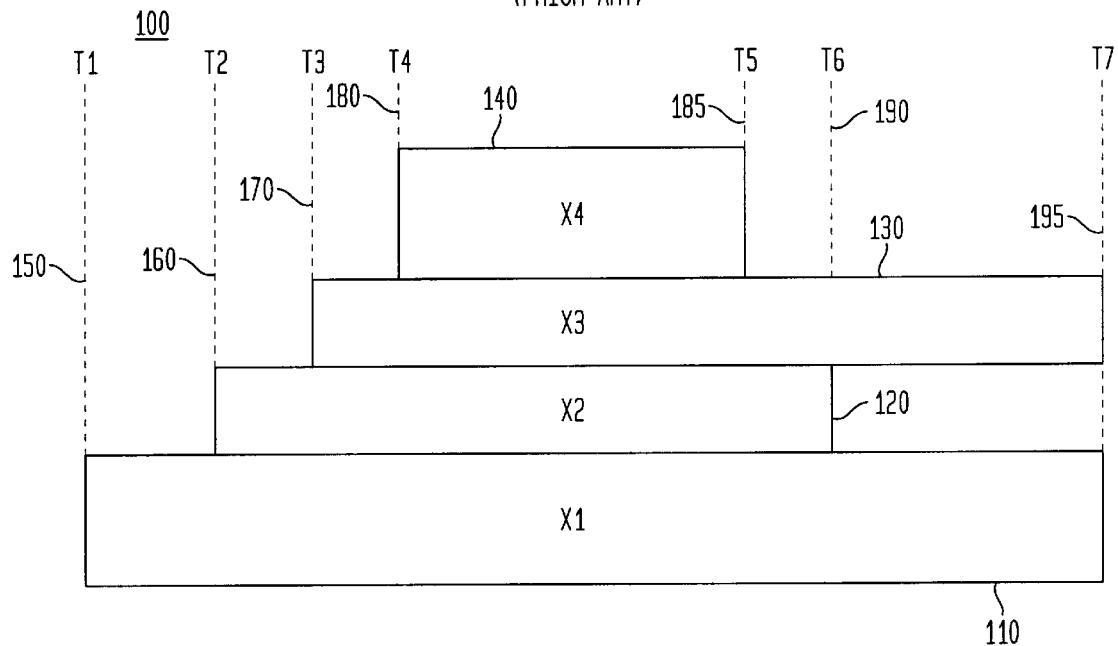
FIG. 1 illustrates a typical prior art arrangement of a composite multimedia object.

Following Chaudhuri et al., we define an $n_i$-ary composite multimedia object $C_i$ as a $(2n_i-1)$-tuple$<X_{i_1}, X_{i_2}, \ldots, X_{i_{n_i}}, t_{i_2}, \ldots, t_{i_{n_i}}>$ where the $X_{i_j}$'s denote the component CM streams (in order of increasing start times) and $t_{i_j}$ denotes the lag factor of $X_{i_j}$ with respect to the beginning of the display of $X_{i_1}$ (that is, the beginning of the composite object). This definition covers the 13 qualitative temporal interval relationships of Allen and also allows us to specify quantitative temporal constraints. FIG. 1 depicts a 4-ary object corresponding to a news story consisting of two overlapping video clips with background music and narration. The height of each stream in FIG. 1 corresponds to its bandwidth requirement, and the length corresponds to its duration (in general, the x-axis represents time).

FIG. 1 illustrates a typical prior art arrangement of a composite multimedia object 100. The composite multimedia object 100 is a 4-ary composite multimedia object representation of a news story. The composite multimedia object 100 consists of four overlapping continuous media (CM) streams. A CM stream can contain any combination of digital video and audio samples. The first of these CM streams, X1 110, contains a high resolution video clip that starts at time T1 150 and continues until time T7 195. The second of these CM streams, X2 120, contains the related narration for X1 110 that starts at time T2 160 and is played concurrently with X1 110 until time T6 190. The third CM stream, X3 130, starts at time T3 170 and contains the related music for X1 110 that plays concurrently with X1 110 and X2 120 until time T6 190 when X2 120 terminates and then X3 130 continues concurrently with X1 110 until time T7 195 when both X1 110 and X3 130 terminate and the object ends. The fourth CM stream, X4 140, starts at time T4 180 and contains a second high resolution video clip that is played in a split screen next to X1 110. X4 140 plays concurrently with X1 110, X2 120, and X3 130 until time T5 185 when X4 terminates and the split screen disappears and only a single screen with X1 110 remains. The height of each stream in FIG. 1 corresponds to its bandwidth requirement and the length corresponds to its duration.

For each component CM stream $X_{i_j}$ of $C_i$, we let $l(X_{i_j})$ denote the time duration of the stream and $r(X_{i_j})$ denote its resource bandwidth requirements. Similarly, we let $l(C_i)$ denote the duration of the entire composite object $C_i$, that is, $l(C_i) = \max_j\{t_{i_j} + l(X_{i_j})\}$, and $r(C_i,t)$ denote the bandwidth requirements of $C_i$ at the $t^{th}$ time slot after its start ($0 \leq t < l(C_i)$). Table 1 summarizes the notation used throughout the paper and provides a brief description of each parameter's semantics. Detailed definitions of some of these parameters are given in the text.

TABLE 1

| Parameter | Semantics |
| --- | --- |
| B | Aggregate server disk bandwidth (in bit per sec -- bps) |
| T | Length of a time unit (that is, round) (in sec) |
| $C_i$ | Composite multimedia object |
| $n_i$ | Number of component streams in $C_i$ |
| $l(C_i)$ | Length (that is, time duration) of $C_i$ |
| $r(C_i,t)$ | Bandwidth requirement of $C_i$ at time slot t ($0 \leq t < l(C_i)$) |
| $r_{max}(C_i)$ | Max. bandwidth requirement of $C_i$ |
| $X_{i_j}$ | The $j^{th}$ component stream of $C_i$ |
| $l(X_{i_j})$, $r(X_{i_j})$ | Length and bandwidth requirement of stream $X_{i_j}$ |

TABLE 1-continued

| Parameter | Semantics |
|---|---|
| $k_i$ | Number of constant bandwidth "blocks" in the run-length compressed form of $C_i$ |
| $(l_{ij}, r_{ij})$ | Length and bandwidth requirement of the $j^{th}$ run-length "block" of $C_i$ |
| $V(C_i)$ | Volume (that is, total resource-time product) of $C_i$ |
| $d(C_i)$ | Density of $C_i$ |

Figure 2:
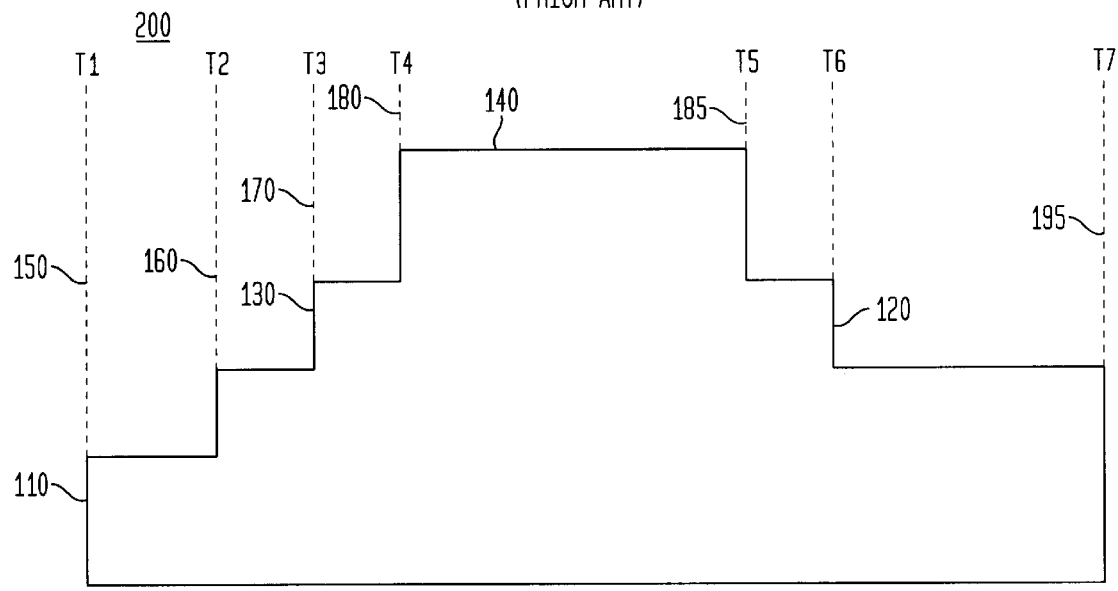
FIG. 2 illustrates the composite object sequence corresponding to the prior art composite multimedia object in FIG. 1.

FIG. 2 illustrates the composite object sequence 200 corresponding to the prior art composite multimedia object 100 in FIG. 1. A "composite object sequence" is a graphical representation of a composite multimedia object's 100 bandwidth requirement during at any given time. The rising edges at T1 150, T2 160, T3 170, and T4 180 correspond to the start of the individual CM streams, X1 10, X2 120, X3 130, and X4 140, respectively. Likewise, the falling edges at T5 185, T6 190, and T7 195 correspond to the end of the individual CM streams, X4 140, X2 120, and X1 110 and X3 130, respectively.

The bandwidth requirements of our example news story object can be represented as the composite object sequence depicted graphically in FIG. 2, where each element of the sequence corresponds to the object's bandwidth demand at that point in time (that is, during that time unit). Note that the rising and falling edges in a composite object sequence correspond to CM streams starting and ending, respectively. Essentially, the object sequence represents $r(C_i, t)$, that is, the (varying) bandwidth requirements of the object as a function of time t. Since our scheduling problem focuses on satisfying the bandwidth requirements of objects, we will treat the terms "composite object" and "sequence" as synonymous hereinafter.

Typically, CM streams tend to last for long periods of time. This means that using the full-length, $l(C_i)$-element object sequence for representing and scheduling a composite multimedia object is a bad choice for the following two reasons. First, these full-length sequences will be very long (for example, a 2-hour presentation will typically span thousands of rounds/time units). Second, full-length object sequences will be extremely redundant and repetitive since they only contain a small number of transition points.

For our purposes, a more compact representation of composite objects can be obtained by using the run-length compressed form of the object sequences. Essentially, the idea is to partition the composite object into "blocks" of constant bandwidth requirement and represent each such block by a pair $(l_{ij}, r_{ij})$, where $r_{ij}$ represents the constant requirement of the object over a duration of $l_{ij}$ time units. This process is shown graphically in FIG. 2, for example, by the dashed lines T1 150 and T2 160. Thus, we can represent the n-ary composite object $C_i$ in a compact manner by the sequence: $<(l_{i_1}, r_{i_1}), \ldots, (l_{i_{k_i}}, r_{i_{k_i}})>$, where $k_i << l(C_i)$. In fact, $k_i \leq 2 \cdot n_i - 1$, where $n_i$ is the number of component CM streams in $C_i$.

We define the volume (V) of a composite object $C_i$ as the total resource-time product over the duration of $C_i$. More formally, $V(C_i) = \sum_{j=1}^{k_i} l_{ij} r_{ij}$. The density (d) of a composite object $C_i$ is defined as the ratio of the object's volume to the volume of its MBR, that is, $$d(C_i) = \frac{V(C_i)}{l(C_i) \cdot r_{max}(C_i)}.$$

Figure 3:
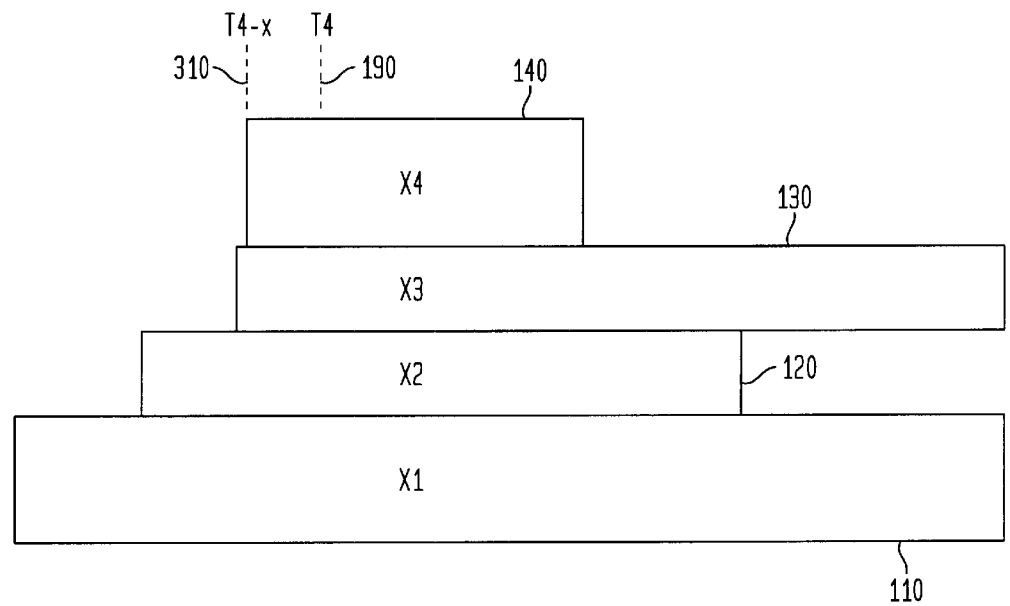
FIG. 3 illustrates the prior art composite multimedia object from FIG. 1 with one of the continuous multimedia streams upslided by some number of time units.

Although inter-media synchronization constraints completely specify the relative timing of streams at presentation time, the scheduler can use extra memory buffers to alter an object's retrieval sequence. This assumes the round-based retrieval of streams with a round length of T, and each stream, $X_{ij}$, requires a minimum buffering of $2 \cdot T \cdot B \cdot r(X_{i_j})$ during its retrieval. The idea is to use additional memory to buffer parts of streams that have been retrieved before they are actually needed in the presentation and play them out from memory at the appropriate time. This method, termed stream sliding, was originally introduced by Chaudhuri et al. for resolving internal contention under the assumption of round-robin striping. The general method is depicted in FIG. 3 which shows our example 4-ary news story object with the second video clip (stream $X_4$) upstided by x time units. "Upsliding" is defined as the retrieving of a CM stream before it is actually needed, buffering it in memory, and then playing it out from memory when it is needed in the presentation. In this example, the server needs to use an extra $x \cdot T \cdot B \cdot r(X_4)$ bits of memory in order to support the object playout as required by the user (FIG. 1). Since it is possible for the amount of upsliding to exceed the actual length of the stream (that is, $x > l(X_4)$), the general expression for the amount of memory required to upslide $X_4$ by x is $\min\{x, l(X_4)\} \cdot T \cdot B \cdot r(X_4)$. This expression says that if $x > l(X_4)$, then we only need enough memory to buffer the entire stream $X_4$. (Note that multiplying by the server bandwidth B is necessary, since r( ) is normalized using B.)

FIG. 3 illustrates the prior art composite multimedia object 100 from FIG. 1 with one of the CM streams upslided by some number of time units, x. In FIG. 3, CM stream X4 140 is upslided from time T4, denoted by 180, to time T4−x, denoted by 310.

Figure 4:
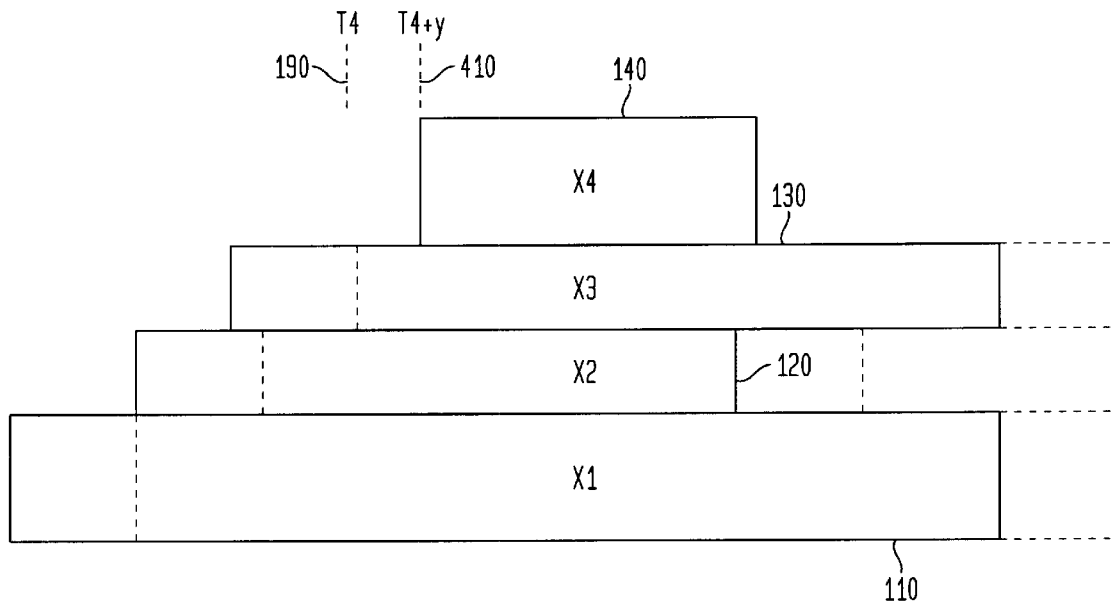
FIG. 4 illustrates the prior art composite multimedia object from FIG. 1 with one of the continuous multimedia streams downslided by some number of time units.

Similarly, the server may also choose to downslide a stream, which means that the retrieval of the stream starts after its designated playout time in the presentation (FIG. 4). Downsliding introduces latency in the composite object presentation, since it is clearly impossible to start the playout of a stream before starting its retrieval. Thus, in FIG. 4, the entire presentation must be delayed by y time units. This also means that once a stream is downslided, all the other streams must be buffered unless they are also downslided by the same amount. As a result, upsliding is preferable to downsliding, whenever both options are available.

FIG. 4 illustrates the prior art composite multimedia object 100 from FIG. 1 with one of the CM streams downslided by some number of time units, y. "Downsliding" is defined as the retrieving of a CM stream after it is actually needed in the presentation. Downsliding introduces latency in the composite multimedia object presentation, since it is impossible to start the playout of a stream before it is retrieved. In FIG. 4, CM stream X4 140 is downslided from time T4, denoted by 180, to time T4+y, denoted by 410. Thus, the entire presentation must be delayed by y time units. This means that once a stream is downslided, all other streams must be buffered unless they are also downslided by the same amount of time y, as shown in FIG. 4 by the dotted outlines on X1 10, X2 120, and X3 130.

Given a collection of composite objects to be scheduled using the server's resources, a schedule is an assignment of start times to these objects so that, at any point in time, the bandwidth and memory requirements of concurrent presentations (to, perhaps, different users) do not violate the resource capacities of the server. We concentrate on the problem of off-line makespan (that is, response time) minimization, in which the objective is to minimize the overall schedule length for a given collection of objects (tasks). Prior scheduling theory research has shown how to employ solutions to this problem for both on-line response time minimization (where tasks arrive dynamically over time) and on-line average response time minimization.

Ignoring the flexibilities allowed in stream synchronization through additional memory buffering (that is, sliding), the bandwidth requirements of each object to be scheduled are completely specified by its resource demand sequence in FIG. 2. Thus, assuming sliding is not an option, our scheduling problem can be abstractly defined as follows.

Given: A collection of (normalized) composite object sequences $\{C_i\}$ over [0,1].

Find: A start time slot $s(C_i)$ for each i, such that for each time slot t $$\sum_{\{C_i : s(C_i) \leq t < s(C_i) + l(C_i)\}} r(C_i, t - s(C_i)) \leq 1,$$

and $\max_i \{s(C_i) + l(C_i)\}$ is minimized.

Conceptually, this corresponds to a sequence packing problem, a non-trivial generalization of traditional NP-hard optimization problems like bin packing and multiprocessor scheduling that, it appears, has not been previously studied in the combinatorial optimization literature. In bin packing terminology, we are given a set of items (normalized object sequences) that we want to pack within unit-capacity bins (server bandwidth) so that the total number of bins (makespan, used time slots) is minimized. Our sequence packing problem also generalizes multidimensional bin packing models known to be intractable, like orthogonal rectangle packing (a rectangle is a trivial, constant sequence) and vector packing (vectors are fixed length sequences with start times restricted to bin boundaries). Note that rectangle packing algorithms are directly applicable when the MBR simplification is adopted. However, it is clear that this simplification can result in wasting large fractions of server bandwidth when the object densities are low. Given the inadequacy of the MBR simplification and the intractability of the general sequence packing formulation, we propose novel efficient heuristics for scheduling composite object sequences using a combination of techniques from pattern matching and multiprocessor scheduling.

Sliding further complicates things, since it implies that the scheduler is able to modify the composite object sequences at the cost of extra memory. Given a set of object sequences and a finite amount of memory available at the server, the problem is how to utilize memory resources for sliding various object streams around (that is, modifying the object sequences) so that the scheduler can effectively minimize some scheduling performance metric such as schedule length or average response time. This is obviously a very complex problem that, in many ways, generalizes recently proposed malleable multiprocessor scheduling problems. Apparently, the general sliding problem, as outlined above, has yet to be addressed in the scheduling or multimedia literature.

Our results for the sequence packing problem indicate that simple, greedy scheduling algorithms based on Graham's list-scheduling method can guarantee provably near-optimal solutions, as long as the sequences are monotonic. On the other hand, we show that list-scheduling can perform poorly when the monotonicity assumption is violated. Based on this result, we examine the problem of exploiting extra memory and sliding to make object sequences monotonic. Although this problem is itself NP-hard, we propose a polynomial-time approximate solution.

Our approach is based on the observation that the result of packing a subset of the given object sequences is itself an object sequence. Thus, we begin by presenting a "basic step" algorithm for obtaining a valid packing of two sequences. We then show how this method can be employed within two different scheduling heuristics to obtain a playout schedule for multiple composite objects.

Our basic algorithmic step problem can be abstractly described as follows. Given two (normalized) object sequences $C_o$ (a new object to be scheduled) and $C_p$ (the partial schedule constructed so far) over [0,1]. We want to determine a valid packing of the two sequences, that is, a way to superimpose $C_o$ over $C_p$ that respects the unit capacity constraint (that is, all elements of the combined sequence are less than or equal to 1). Given that our overall scheduling objective is to minimize the length of the resulting composite sequence, the presentation of this section assumes a "greedy" basic step that searches for the first point of $C_p$ at which $C_o$ can be started without causing capacity constraints to be violated. Since the full-length representation of the object sequences is very inefficient, we assume that both object sequences are given in their run-length compressed form. That is, $C_o = <(l_{o_1}, r_{o_1}), \ldots, (l_{o_{k_o}}, r_{o_{k_o}})>$ and $C_p = <(l_{p_1}, r_{p_1}), \ldots, (l_{p_{k_p}}, r_{p_{k_p}})>$. In Table 2, we present an algorithm, termed FINDMIN, for performing the basic sequence packing step outlined above. FINDMIN is essentially a "brute-force" algorithm that runs in time $O(k_o \cdot k_p)$, where $k_o$, $k_p$ are the lengths of the compressed object sequences.

TABLE 2

Algorithm FINDMIN($C_o$, $C_p$).

Input: Sequences $C_o$, $C_p$ over [0,1] in run-length compressed form (that is, $C_o = <(l_{o_1}, r_{o_1}), \ldots, (l_{o_{k_o}}, r_{o_{k_o}})>$ and $C_p = <(l_{p_1}, r_{p_1}), \ldots, (l_{p_{k_p}}, r_{p_{k_p}})>).$ Output: The least $0 \leq k \leq l(C_p)$ such that $C_o$ can be validly superimposed over $C_p$ starting at time slot k.

1. For each constant bandwidth block $<l_{o_j}, r_{o_j}>$ of $C_o$, determine the set of feasible starting points $S_{o_j}$ for $<l_{o_j}, r_{o_j}>$ over $C_p$. For a given j, this can be done in time $O(k_p)$ and the result is a union of $m_j = O(k_p)$ disjoint temporal intervals:

$S_{o_j} = [a_{j_1}, b_{j_1}) \cup \ldots \cup [a_{j_{m_j}}, b_{j_{m_j}}),$ where $b_{j_{m_j}} = \infty$ (at the end of the current partial schedule $C_p$).

2. Let $I_1 = S_{o_1}$. For j = 2 to $k_o$ do $I_j = I_{j-1} \cap ([a_{j_1} - (l_{o_1} + \ldots + l_{o_{j-1}}),$ $b_{j_1} - (l_{o_1} + \ldots + l_{o_{j-1}})) \cup \ldots \cup [a_{j_{m_j}} - (l_{o_1} + \ldots + l_{o_{j-1}}),$ $b_{j_{m_j}} - (l_{o_1} + \ldots + l_{o_{j-1}})))$ Let $|S|$ denote the number of intervals in S. Since the intervals in the unions $S_{o_j}$ are disjoint and in sorted order, each intersection $I_j$ can be computed in time $O(|I_{j-1}| + |S_{o_j}|)$ using a MERGE-like algorithm, and

TABLE 2-continued

Algorithm FINDMIN($C_o$, $C_p$).

a simple argument can establish that
$|I_j| \leq \min\{|I_{j-1}|, |S_{o_j}|\} = O(k_p)$.

3. At this point, $I_{k_o}$ contains the entire set of feasible starting time slots for $C_o$. Return the earliest slot in $I_{k_o}$.

---

Since our composite object sequences can be seen as patterns over the alphabet [0,1], it is natural to ask whether or not ideas from the area of pattern matching can be used to make our basic algorithmic step more efficient. As in most pattern matching problems, the requirement that all "characters" of both patterns must be examined imposes a linear, that is, $O(k_o+k_p)$ (since we are dealing with the compressed representations), lower bound on the running time of any algorithm. The question is whether or not this lower bound is attainable by some strategy. An equivalent formulation of our basic step packing problem comes from considering the complementary sequence $\overline{C_p}$ of the partial schedule $C_p$, which informally, corresponds to the sequence of free server bandwidth over time. More formally, $\overline{C_p}$ is determined by defining $r(\overline{C_p}, t)=1-r(C_p, t)$, for each time slot t. Thus, our problem is equivalent to finding the earliest time slot at which $C_o$ is completely "covered" (dominated) by $\overline{C_p}$. This is a problem that has received some attention from the pattern matching research community. Amir and Farach define the above problem for uncompressed patterns as the "smaller matching" problem and give an algorithm that runs in time $O(l(C_p) \cdot \sqrt{l(C_o)} \cdot \log l(C_o))$, where $l(\ )$ denotes uncompressed sequence lengths. Muthukrishnan and Palem show that this is in fact a lower bound on the time complexity of the problem in a special, yet powerful convolution-based model; their result implies that faster algorithms for the smaller matching problem would imply a faster method than the Fast Fourier Transform for certain generalizations of convolutions.

None of these papers address the problem encountered when run-length compressed forms of the patterns are used. Furthermore, it is not clear whether the rather complicated algorithm of Amir and Farach will outperform a straight-forward $O(l(C_p) \cdot l(C_p))$ solution in a practical implementation. Finally, even if the "optimal" method of Amir and Farach could be extended to run-length compressed patterns, the asymptotic performance improvement with respect to FINDMIN would only be $$O\left(\frac{\sqrt{k_o}}{\log k_o}\right),$$

a small gain since the number of streams in a single composite object $k_o$ is typically bounded by a small constant.

Thus, prior results from the pattern matching community assure us that our "brute-force" FINDMIN algorithm is a reasonably good strategy for the basic sequence packing step for general object sequences. However, for special cases of object sequences ($C_o$), we may still be able to come up with faster algorithms. One such algorithm for the special case of bitonic object sequences, for purposes of the following discussion, is called BITONIC-FINDMIN.

Figure 5:
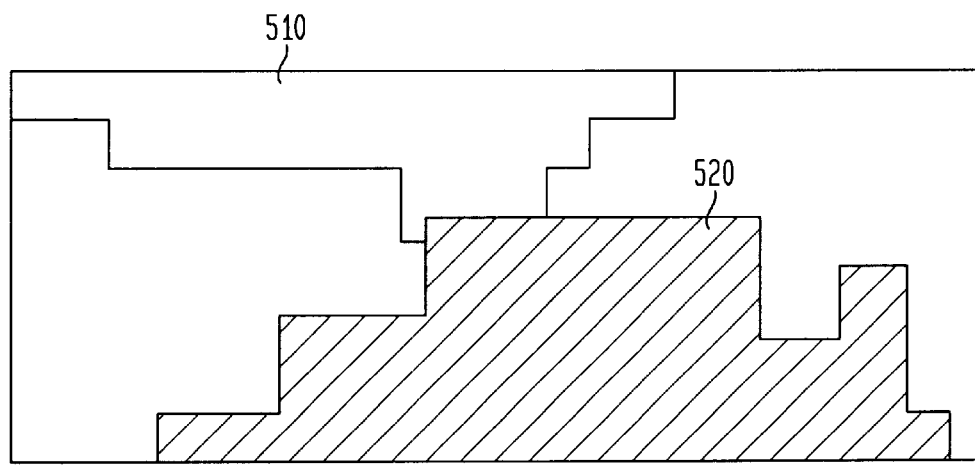
FIG. 5 illustrates a collision between two normalized object sequences.

FIG. 5 illustrates a collision between two normalized object sequences, an object sequence $C_o$ 510 and the partial schedule $C_p$ 520 of all previously scheduled object sequences. In FIG. 5, $C_o$ 510 is a bitonic object sequence. A "bitonic" object sequence is a sequence that can be partitioned into a monotonically increasing prefix followed by a monotonically decreasing prefix. This means that no new component streams can be initiated after the end of a stream in the presentation.

Figure 6:
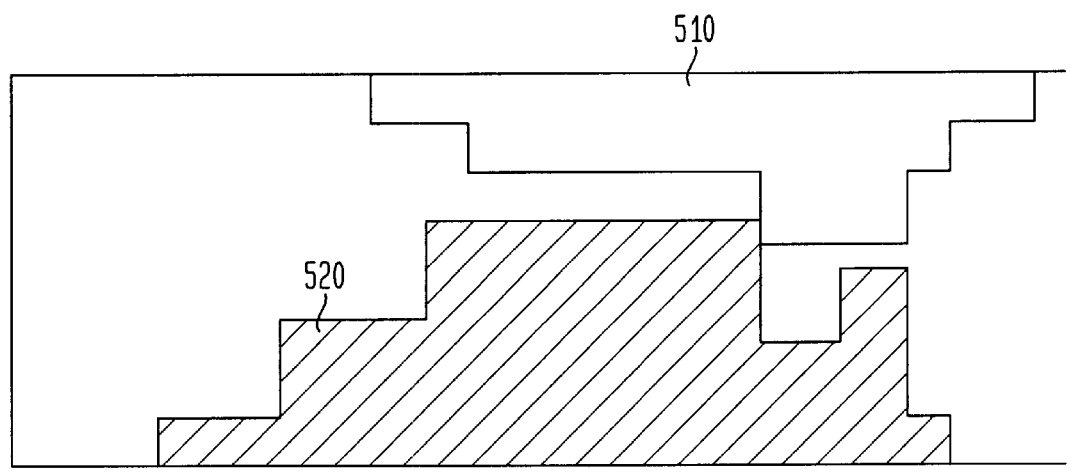
FIG. 6 illustrates a sequence packing solution for the two normalized object sequences in FIG. 1.

FIG. 6 illustrates a sequence packing solution for the collision of the two normalized object sequences, $C_o$ 510 and $C_p$ 520, in FIG. 5. To align any given object sequence with any given $C_p$, we can use the algorithm FINDMIN. However, since $C_o$ 510 is a bitonic object sequence, we can also use the faster BITONIC-FINDMIN algorithm to align it with $C_p$ 520. The result shown in FIG. 6 is the resolution of the collision by align-ing using the BITONIC-FINDMIN algorithm.

Although one can argue that bitonic objects are rather common in multimedia practice (for example, our example news story composite object shown in FIG. 1 is bitonic), our method can also be used within more complex basic step algorithms for general sequences. The idea is to partition objects into a (small) number of bitonic components and schedule each component using our improved strategy for bitonic objects.

The basic operation of our improved algorithm for bitonic objects is similar to that of the Knuth-Morris-Pratt string matching algorithm, in that it shifts the $C_o$ pattern over $C_p$ until a "fit" is discovered. The crucial observation is that, for bitonic $C_o$ patterns, we can perform this shifting in an efficient manner, without ever having to backtrack on $C_p$. This is done as follows. Consider a particular alignment of $C_o$ and $C_p$ and let $(l_{p_j}, r_{p_j})$ be the first block of $C_p$ at which a "collision" (that is, a capacity violation) occurs. Then the earliest possible positioning of $C_o$ that should be attempted (without losing possible intermediate positions) is that which aligns the right endpoint of block $(l_{p_j}, r_{p_j})$ with that of block $(l_{o_{ij}}, r_{o_{ij}})$, where $i_j$ is the index of the latest block in the increasing segment of $C_o$ such that $r_{p_j}+r_{o_{ij}} \geq 1$. We denote this alignment operation by align(j,$i_j$), and an example result is depicted in FIG. 6. To make the presentation uniform, we assume the existence of a zero block for both sequences, with $l_{p_0}=l_{o_0}=0$. Our improved basic step algorithm for bitonic $C_o$, termed BITONIC-FINDMIN, is depicted in Table 3.

The time complexity of algorithm BITONIC-FINDMIN is $O(k_o+k_p \cdot \log k_o)$. The first term comes from the preprocessing step for $C_o$. The second term is based on the observation that both the partial sums vector $s_j$ and the bandwidth requirements vector for the increasing segment of $C_o$ are sorted, which means that the "find the least/largest index such that <condition>" steps of BITONIC-FINDMIN can be performed in time $O(\log k_o)$, using binary search. More elaborate search mechanisms (for example, based on Thorup's priority queue structures from Mikkel Thorup, "On RAM Priority Queues", *Proceedings of the Seventh Annual ACM-SIAM Symposium on Discrete Algorithms*, pages 59–67, Atlanta, Ga., January 1996) can be employed to reduce the asymptotic complexity of BITONIC-FINDMIN to $O(k_o+k_p \cdot \log \log k_o)$.

We present a heuristic algorithm that uses the basic packing step described above in the manner prescribed by Graham's greedy list-scheduling strategy for multiprocessor scheduling. The operation of our heuristic, termed LS, is as follows. Let L be a list of the composite object sequences to be scheduled. At each step, the LS algorithm takes the next object from L and (using FINDMIN or BITONIC-FINDMIN) places it at the earliest possible start point based on the current schedule. This rule is identical to Graham's list-scheduling rule for an m-processor system, when all objects have a constant bandwidth requirement of 1/m throughout their duration.

Figure 7:
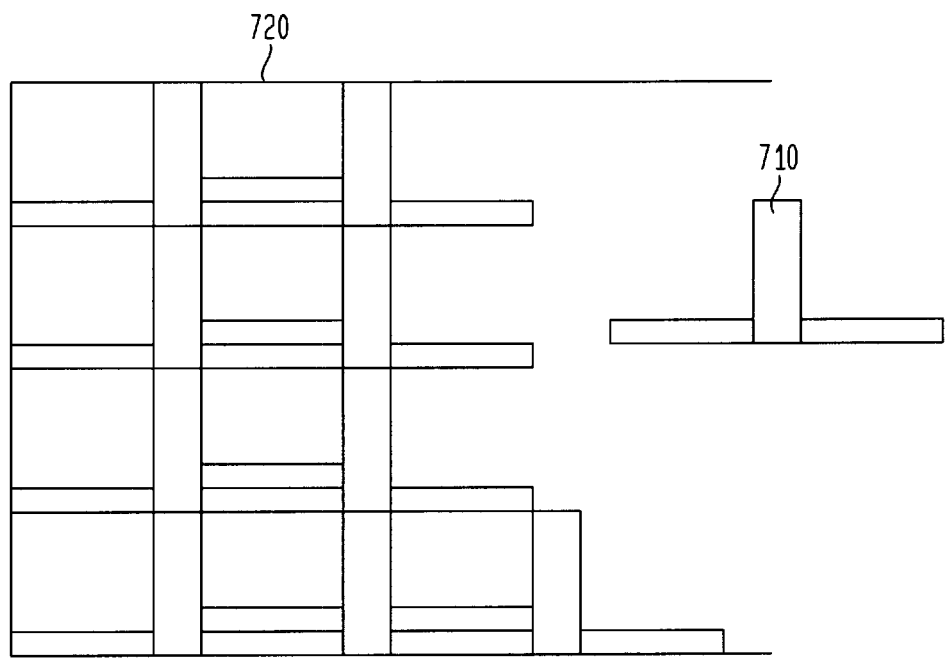
FIG. 7 illustrates a worst case example composite object schedule created using the list-scheduling (LS) algorithm.

Unfortunately, this simple list-scheduling rule does not offer a good guaranteed worst-case bound on the suboptimality of the obtained schedule. Even for the special case of bitonic objects, it is easy to construct examples where the makespan of the list schedule is $\Omega(\min\{l, |L|\})$ times the optimal makespan, where $|L|$ is the number of objects and l is the length (in rounds) of an object sequence. One such bad example for LS is depicted in FIG. 7. Note that as the example object sequences become more "peaked", the behavior of LS compared to the optimal schedule becomes even worse. However, even for this bad example, LS will behave significantly better than MBR scheduling, which would not allow any overlap between consecutive "columns" in the schedule.

TABLE 3

Algorithm BITONIC-FINDMIN($C_o$, $C_p$)

Input: Sequences $C_o$, $C_p$ over [0,1] in run-length compressed form (that is, $C_o = <(l_{o_1}, r_{o_1}), \ldots, (l_{o_{k_o}}, r_{o_{k_o}})>$ and $C_p = <(l_{p_1}, r_{p_1}), \ldots, (l_{p_{k_p}}, r_{p_{k_p}})>)$.

Sequence $C_o$ is assumed to be bitonic.

Output: The least $0 \leq k \leq l(C_p)$ such that $C_o$ can be validly superimposed over $C_p$ starting at time slot k. description 1. Preprocess $C_o$ to obtain a "partial sums" vector $s_j = \sum_{m=1}^{j} l_{o_m}$ for $j = 1, \ldots, k_o$.

2. Initialize: align(0,0), j = i = 0, $l_{cov} = 0$.
3. while ($l_{cov} < l(C_o)$) do
 3.1 Find the least $i_j$ such that $s_{i_j} - l_{cov} \geq l_{p_j}$.
 3.2 To check for a collision at block ($l_{p_j}, r_{p_j}$) we distinquish two cases.
 $C_o$ is decreasing after $l_{cov}$. (We just need to check the first block of $C_o$ placed over ($l_{p_j}, r_{p_j}$).) If $r_{p_j} + r_{o_{i_j}} \leq 1$ (that is, no collision) then set
$l_{cov} = l_{cov} + l_{p_j}$, j = j + 1, i = $i_j$.
Else, find the largest block index m in the increasing part of $C_o$ such that $r_{o_m} \leq 1 - r_{p_j}$, shift $C_o$ to align(j,m), and set i = m, j = j + 1, $l_{cov} = s_m$.
$C_o$ is increasing after $l_{cov}$. If the block index $i_j$ is in the decreasing part of $C_o$ then check if
$r_{p_j} + r_{max}(C_o) \leq 1$, otherwise check if $r_{p_j} + r_{o_{i_j}} \leq 1$.

If the condition holds set $l_{cov} = l_{cov} + l_{p_j}$, j = j + 1, i = $i_j$. Else, find the largest block index m in the increasing part of $C_o$ such that $r_{o_m} \leq 1 - r_{p_j}$, shift $C_o$ to align(j,m), and set i = m, j = j + 1, $l_{cov} = s_m$.
4. Return the starting time slot for the current placement of $C_o$.

FIG. 7 illustrates a worst case example composite object schedule created using the list-scheduling (LS) algorithm. In FIG. 7, the composite object sequence 710 represents the shape of all the individual objects in a list of composite object sequences in the schedule 720. The schedule 720 is produced using the LS algorithm and either FINDMIN or BITONIC-FINDMIN to place each object, in turn, at the earliest possible starting point based on the current schedule. As can be seen in FIG. 7, the schedule 720 is less than optimal.

Thus, in the worst case, the behavior of LS can be arbitrarily bad compared to the optimal schedule. Furthermore, note that since all the objects in the example of FIG. 7 are identical, ordering the list L in any particular order (for example, by decreasing object "height") will not help worst-case behavior. Assuming the maximum resource requirements of objects (that is, $r_{max}(C_i)$'s) to be bounded by some small constant (a reasonable assumption for large-scale CM servers) also does not help, as long as the objects are sufficiently "peaky".

However, as the following theorem shows, the situation is much better when the object sequences in L are appropriately constrained.

Theorem 1. Let L be a list of monotonically non-increasing composite object sequences $C_i$ and assume that $r_{max}(C_i) \leq \lambda < 1$, for each i. Also, let $l_{max}(L) = \max_i\{l(C_i)\}$ and $V(L) = \Sigma_i V(C_i)$ (that is, the total volume in L), and let $T_{OPT}(L)$ be the makespan of the optimal schedule for L. Then, the makespan returned by LS, $T_{LS}(L)$, satisfies the inequality:

$$T_{LS}(L) \frac{V(L)}{1-\lambda} l_{max}(L) \leq \left(1 + \frac{1}{1-\lambda}\right) \cdot T_{OPT}(L).$$

It is easy to see that a slightly modified version of LS can guarantee the same worst-case performance bound for any list of monotonically non-decreasing objects, as well. The basic idea is to "time-reverse" each object sequence and schedule these reversed (non-increasing) sequences using LS. Of course, the schedule obtained is then played out in reverse (that is, from end to start). We can combine these observations with algorithm LS to obtain the following simple strategy, termed Monotonic LS (MLS), for scheduling monotonic objects. First, schedule all non-increasing sequences using LS. Second, reverse all remaining objects and schedule them using LS. Third, concatenate the two schedules. It is easy to prove the following corollary.

Corollary 1. For any list L of monotonic composite objects $C_i$ with $r_{max}(C_i) \leq \lambda < 1$, for each i, algorithm MLS guarantees a makespan $T_{MLS}(L)$ such that:

$$T_{MLS}(L) \frac{V(L)}{1-\lambda} 2 \cdot l_{max}(L) \leq \left(2 + \frac{1}{1-\lambda}\right) \cdot T_{OPT}(L).$$

With respect to the time complexity of our list-scheduling algorithms, it is easy to see that the decisive factor is the complexity of the basic packing step discussed above. Using the FINDMIN algorithm for general object sequences implies an overall time complexity of $O(N^2)$, where $N = \Sigma_{C_i \in L} n_i$ is the total number of streams used in L. If all the sequences are bitonic or monotonic, BITONIC-FINDMIN can be used giving an overall time complexity of $O(N \cdot |L| \cdot \log N/|L|)$. (Note that the number of composite objects $|L|$ is smaller than the number of streams N and the average number of streams per object $N/|L|$ is typically a small constant.)

Figure 8:
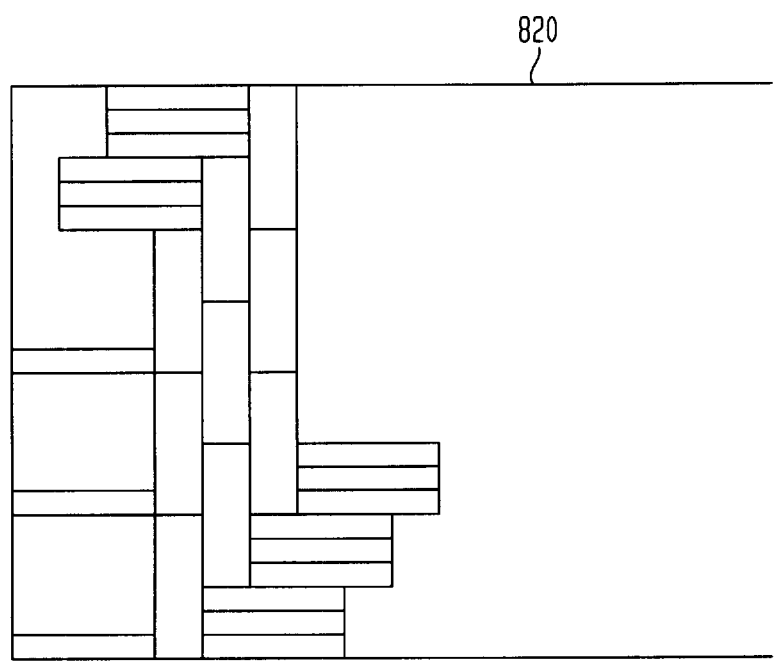
FIG. 8 illustrates the optimal schedule of the composite objects in FIG. 7.

FIG. 8 illustrates the optimal schedule for the composite objects in FIG. 7.

Informally, we define a monotonic cover of a composite object $C_i$ as another composite object $\hat{C}_i$ that (a) is monotonic, and (b) completely "covers" $C_i$ at any point in time. More formally:

Definition 1. A monotonic cover for $C_i = <(l_{i_1}, r_{i_1}), \ldots, (l_{i_{k_i}}, r_{i_{k_i}})>$ is an object $\hat{C}_i = <(l_{i_1}, \hat{r}_{i_1}), \ldots, (l_{i_{k_i}}, \hat{r}_{i_{k_i}})>$ such that $\hat{r}_{i_j} \geq r_{i_j}$ for each j and $\hat{r}_{i_j} \geq \hat{r}_{i_{j+1}}$ for j=1, ..., $k_i$-1 or $\hat{r}_{i_j} \leq \hat{r}_{i_{j+1}}$ for j=1, ..., $k_i$-1.

Corollary 1 suggests an immediate improvement over the simplistic MBR assumption for scheduling composite multimedia objects: Instead of using the MBR of an object $C_i$, use a minimal monotonic cover of $C_i$, that is, a monotonic cover that minimizes the extra volume. List-scheduling the monotonic covers of composite objects (using MLS) is an attractive option because of the following two reasons. First, compared to scheduling the object sequences unchanged, using the covers implies a simpler placement algorithm (a special case of BITONIC-FINDMIN), with reduced time complexity. Second, compared to using MBRs, minimal monotonic covers can significantly reduce the amount of wasted volume in the cover. (Note that a MBR is itself a trivial monotonic cover.) For example, in the case of a bitonic object, a minimal monotonic cover wastes at most half the volume that would be wasted in an MBR cover. Also note that the minimal monotonic cover of a compressed composite object sequence can be easily computed in linear time.

A different way of employing our near-optimality results for list-scheduling in the case of monotonic objects is through the use of the stream sliding techniques described above. The idea is to use extra server memory to turn non-monotonic object sequences into monotonic ones. We now address the problem of efficiently utilizing server memory to make composite object sequences monotonic. More specifically, we concentrate on the use of stream upsliding to convert an object sequence to a non-increasing sequence with minimal extra memory. Our techniques are also applicable to the dual problem (that is, making sequences non-decreasing by stream downsliding). However, as we discussed, downsliding introduces latencies into the schedule and should therefore be avoided. Possible techniques that combine both upsliding and downsliding are left as an open problem for future work.

A straightforward way of making an object sequence non-increasing is to simply upslide all streams with a non-zero lag to the beginning of the composite object. Given an object $C_i$, this naive approach will obviously require a total memory of $$B \cdot \sum_{j=2}^{n_i} lt_{i_j} \cdot r_{i_j},$$

where we define $lt_{i_j} = \min(\{l(X_{i_j}), t_{i_j}\})$.

Figure 9:
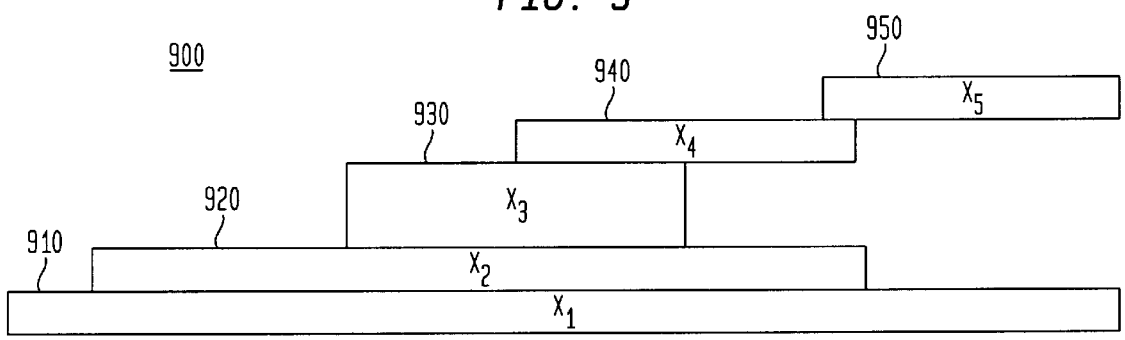
FIG. 9 illustrates a 5-ary composite multimedia object.

FIG. 9 illustrates a 5-ary composite multimedia object 900. The 5-ary composite multimedia object 900 is composed of CM object streams X1 910, X2 920, X3 930, X4 940, and X5 950. Each of these streams starts at different times and creates a monotonically increasing composite multimedia object 900.

Figure 10:
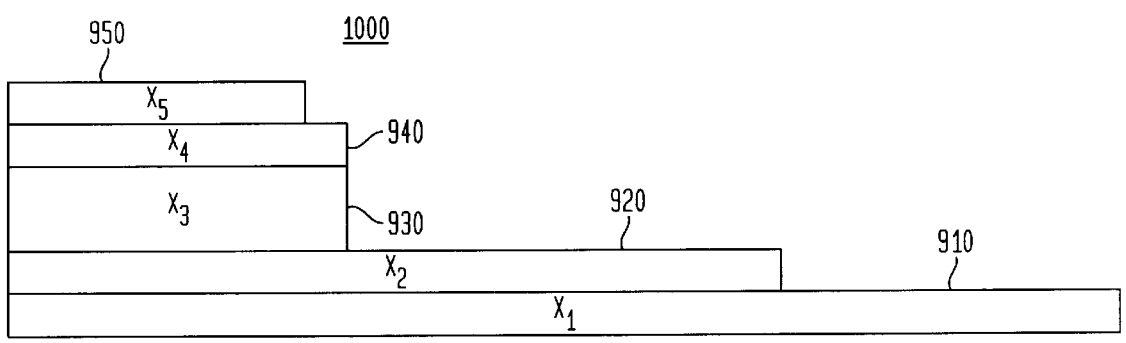
FIG. 10 illustrates a non-increasing object sequence of the composite multimedia object in FIG. 9 created using "naive" stream upsliding.

FIG. 10 illustrates a non-increasing composite multimedia object sequence 1000 of the composite multimedia object 900 in FIG. 9 created using naive stream upsliding. In this sequence, we upslide all streams with a non-zero lag (X2 920, X3 930, X4 940, and X5 950) to the beginning of the composite object to create a non-increasing composite multimedia object.

However, we can do significantly better than simple upsliding. The idea is that, depending on the object's structure, it may be possible for some stream to "shield" the starting edge of another stream, without requiring the second stream to be upslided all the way to the beginning of the object. This is depicted graphically in FIG. 11. Note that the use of such clever upsliding methods not only reduces the amount of memory required for making the object monotonic, but it also reduces the maximum bandwidth requirement of the object (that is, $r_{max}(C_i)$). This is obviously important since it implies smaller $\lambda$'s in Theorem 1 and, consequently, better worst-case performance guarantees for LS.

Figure 11:
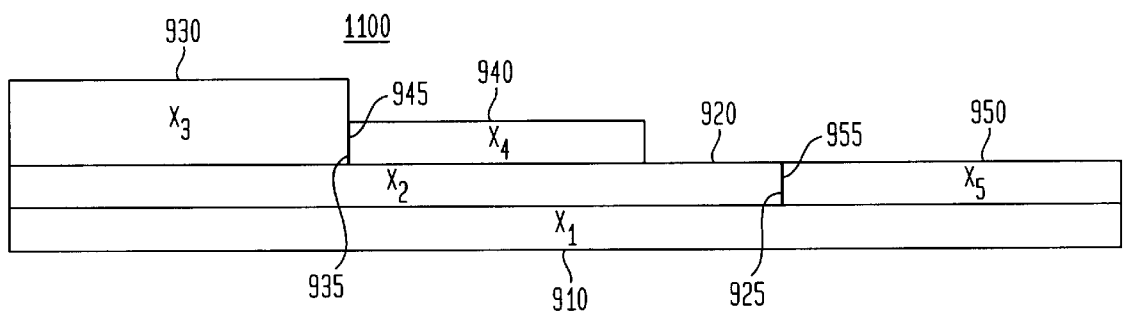
FIG. 11 illustrates a non-increasing object sequence of the composite multimedia object in FIG. 9 created using "clever" stream upsliding.

FIG. 11 illustrates a non-increasing composite multimedia object sequence 1100 of the composite multimedia object 900 in FIG. 9 created using clever stream upsliding. In FIG. 11, X2 920 and X3 930 are upslid to the beginning of the composite multimedia object 1100. X4 940, is then upslid so that the starting edge of X4 945 abuts and is shielded by the back edge of X3 935. Similarly, X5 950 is upslid so that the starting edge of X5 955 abuts and is shielded by the back edge of X4 945.

Unfortunately, as the following theorem from M. R. Garey and D. S. Johnson, *Computers and Intractability: A Guide to the Theory of NP-Completeness*, W. H. Freeman, 1979 teaches, this problem of optimal (that is, minimum memory) stream upsliding is NP-hard. This result can be proved using the observation that each stream can shield multiple streams to give a reduction from PARTITION.

Theorem 2. Given a composite object sequence $C_i$, determining an optimal (that is, minimum memory) sequence of stream upslides to make $C_i$ non-increasing is NP-hard.

Given the above intractability result, we now propose a simple heuristic strategy for improving upon the naive "upslide everything" method. Our solution is based on the following definition that simply states the above observations in a more formal manner.

Definition 2. Consider a composite object $C_i$. We say that stream $X_{i_j}$ can shield stream $X_{i_k}$ ($k \approx j$) if and only if $l(X_{i_j}) \leq t_{i_k}$ and $r(X_{i_j}) \geq r(X_{i_k})$. The benefit of shielding $X_{i_k}$ by $X_{i_j}$ is defined as:

$$b(j,k) = \begin{cases} B \cdot (X_{i_k}) \cdot (lt_{i_k} - \min\{l(X_{i_k}), t_{i_k} - l(X_{i_j})\}), & \text{if } X_{i_j} \text{can shield } X_{i_k} \\ 0, & \text{otherwise} \end{cases}$$

The intuition behind Definition 2 can be seen from FIGS. 12(*a*)–(*d*). The benefit $b(j,k)$ is exactly the gain in server memory (compared to the naive "upslide everything" solution) by using $X_{i_j}$ to shield $X_{i_k}$. Our heuristic strategy for stream upsliding uses an edge-weighted graph representation of the "can shield" relationships in a composite object $C_i$. Specifically, we define the shield graph of $C_i$, $SG(C_i)$, as an undirected graph with nodes corresponding to the streams $X_{i_j}$ of $C_i$ and an edge $e_{jk}$ between node $X_{i_j}$ and $X_{i_k}$ if and only if $X_{i_j}$ can shield $X_{i_k}$ or $X_{i_k}$ can shield $X_{i_j}$. The weight w( ) of an edge is defined as the maximum gain in memory (compared to the naive approach) that can result by utilizing that edge. More formally, we define $w(e_{jk}) = \max\{b(j,k), b(k,j)\}$.

Our heuristic method for stream upsliding builds the shield graph $SG(C_I)$ for object $C_I$ and determines a maximum weighted matching M on $SG(C_I)$. Essentially, this matching M is a collection of node-disjoint edges of $SG(C_I)$ with a maximum total weight $w(M) = \Sigma_{e_{jk} \in M} w(e_{jk})$. The maximum weighted matching problem for $SG(C_I)$ can be solved in time $_O(n_i^3)$, where $n_i$ is the number of streams in $C_i$. The edges in M determine the set of "stream shieldings" that will be used in our approximate upsliding solution. Furthermore, by our edge weight definitions, it is easy to see that the total amount of memory that will be used equals exactly $$B \cdot \left( \sum_{j=2}^{n_i} lt_{i_j} \cdot r_{i_j} \right) - w(M),$$

that is, the memory required by the naive approach minus the weight of the matching.

The problem with the stream sliding approach outlined above is that it may often require large amounts of memory per object that the server simply cannot afford. In such cases, we are still faced with the general sequence packing problem. The sequence packing results indicate that using a simple list-scheduling approach for general object sequences can result in arbitrarily bad sequence packings, leading to severe underutilization of the server's bandwidth resources. The main problem of LS is that by making greedy (that is, earliest start time) decisions on the placement of objects at each step, it may end up with very "sparse" sequence packings (that is, schedules with very poor density). This is clearly indicated in the example of FIG. 7. Thus, it appears that a better scheduling rule would be, instead of trying to minimize the start time of the new object in the current schedule, try to maximize the density of the final, combined sequence. However, maximizing density alone also does not suffice. Returning to the example of FIG. 7, it is fairly easy to see that the placement that maximizes the density of the final object is one that simply juxtaposes all the object peaks (that is, it never places one peak on top of another). Since our goal is to minimize the overall schedule length, this is not satisfactory. Instead of trying to maximize density alone, the scheduler should also make sure that the entire bandwidth capacity of the server (that is, height of the bin) is utilized. (Note that using the server's bandwidth capacity instead of $r_{max}$ to define object density does not help; since the bandwidth is fixed, placing objects to maximize this new density is equivalent to trying to maximize their overlap with the current schedule, that is, the LS rule.)

Therefore, to solve this problem, we propose a novel family of scheduling heuristics for sequence packing, termed list-scheduling with k-object backtracking (LSB(k)). Informally, these new algorithms try to improve upon simple LS by occasional local improvements to the schedule. More specifically, the operation of LSB(k) is as follows. The algorithm schedules objects using simple LS, as long as the incoming objects can be placed in the current schedule without causing the length of the schedule to increase. When placing a new object results in an increase in the makespan, LSB(k) tries to locally improve the density of the schedule and check if this results in a better schedule. This is done in four steps. First, the last k objects scheduled are removed from the current schedule. Second these k object sequences are combined into a single sequence in a manner that tries to maximize the density of the resulting sequence. Third, the "combined" sequence is placed in the schedule using simple LS. Finally, the length of this new schedule is compared to that of the original schedule, and the shorter of the two is retained. The second step in the above procedure can be performed using a slightly modified version of FINDMIN (Table 2). The main idea is to maintain some additional state with each interval of candidate start times (step 1) and update this state accordingly when taking interval intersections (step 2). We term the resulting basic step algorithm FINDMIN-D. Similar modifications can also be defined for the BITONIC-FINDMIN algorithm for bitonic object sequences $C_o$. The complete LSB(k) algorithm is provided in Table 4 below.

TABLE 4

Algorithm LSB(k, L).

Input: A list of composite object sequences L = <$C_1$, . . . , $C_n$> and a backtracking parameter k.
Output: A valid packing of the object sequences in L.
1. Set $T_{curr}$ = 0, $C_p$ = φ.
2. For i = 1 to n do
   2.1 Schedule $C_i$ at time slot FINDMIN($C_i$, $C_p$).
      Let $T'_{curr}$ be the length of the resulting schedule.

TABLE 4-continued

Algorithm LSB(k, L).

2.2 If $T'_{curr}$ = $T_{curr}$ continue. Else, do the following.
     2.2.1 Remove $C_i$ and the k − 1 objects from $C_p$.
          (If k exceeds the number of objects in $C_p$, remove all objects from $C_p$.)
     2.2.2 Set C = φ and schedule each object $C_j$ removed from $C_p$ using FINDMIN − D($C_j$,C).
     2.2.3 Schedule C over the remainder of $C_p$ using FINDMIN($C_i$,$C_p$). Let $T''_{curr}$ be the length of the resulting schedule.
       i. If $T'_{curr}$ ≦ $T''_{curr}$, set $T_{curr}$ = $T'_{curr}$, restore the original $C_p$, and continue with the next $C_i$. Else, leave $C_p$ as is, set $T_{curr}$ = $T''_{curr}$, record that C is now a single object, and continue with the next $C_i$.

The extra effort involved in backtracking to improve schedule density translates to increased time complexity for LSB(k) compared to simple LS. Specifically, the complexity of LSB(k) can be shown to be $O(|L| \cdot N_2)$, where $|L|$ is the number of objects to be scheduled and N is the total number of component streams. This, of course, is assuming general object sequences that cannot employ the more efficient basic step algorithms.

Figure 12A:
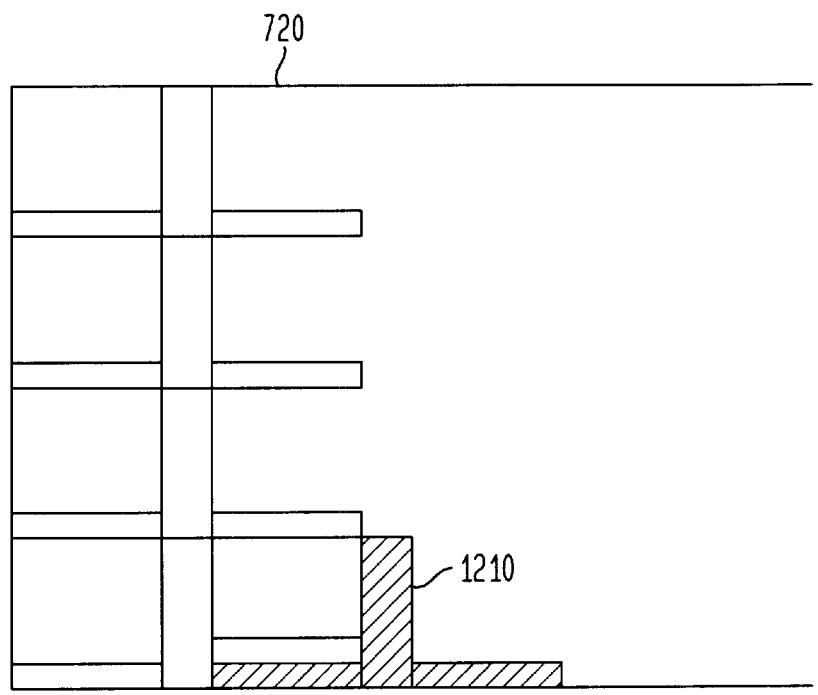
FIG. 12(a) illustrates the first backtracking point in the operation of the list-scheduling with k-object backtracking $LSB_{(k)}$ algorithm.
Figure 12B:
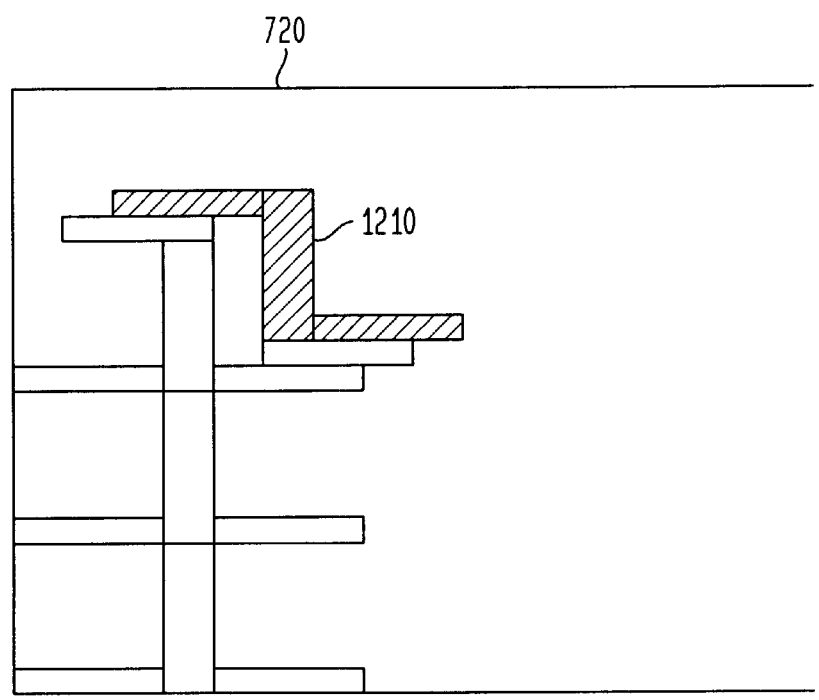
FIG. 12(b) illustrates the results of the $LSB_{(k)}$ algorithm on the composite multimedia object schedule in FIG. 12(a).

FIGS. 12(a)–12(b) show the operation of the LSB(k) algorithm, where k=3, on our "bad" example for LS shown in FIG. 7. FIG. 12(a) illustrates the first backtracking point in the operation of the list-scheduling with k-object backtracking LSB(k) algorithm. More specifically, FIG. 12(a) shows the schedule after the placement of the fifth object 1210, at which point the algorithm is first forced to backtrack, trying to locally improve schedule density.

FIG. 12(b) illustrates the results of the LSB(k) algorithm on the composite multimedia object schedule in FIG. 12(a). The result of the improved density packing (after using FINDMIN-D to combine the last three objects) is depicted in FIG. 12(b). Since this schedule is shorter than the one in FIG. 12(a), it is retained and LSB(3) goes back to using LS.

Figure 12C:
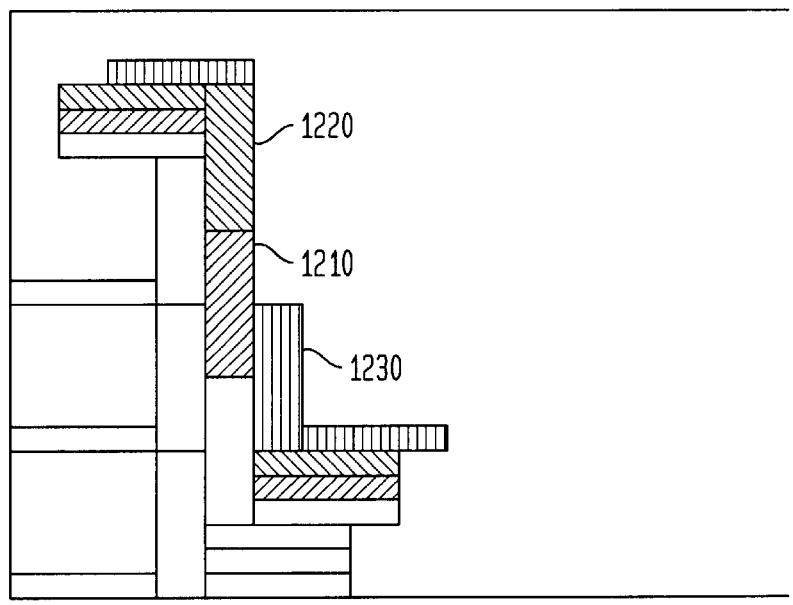
FIG. 12(c) illustrates the schedule after the LS algorithm places the sixth and seventh composite multimedia objects in the schedule in FIG. 12(b).

FIG. 12(c) illustrates the schedule after the LS algorithm places the sixth and seventh composite multimedia objects in the schedule in FIG. 12(b). FIG. 9(c) shows the schedule after LS places the sixth and seventh objects, 1220 and 1230 respectively.

Figure 12D:
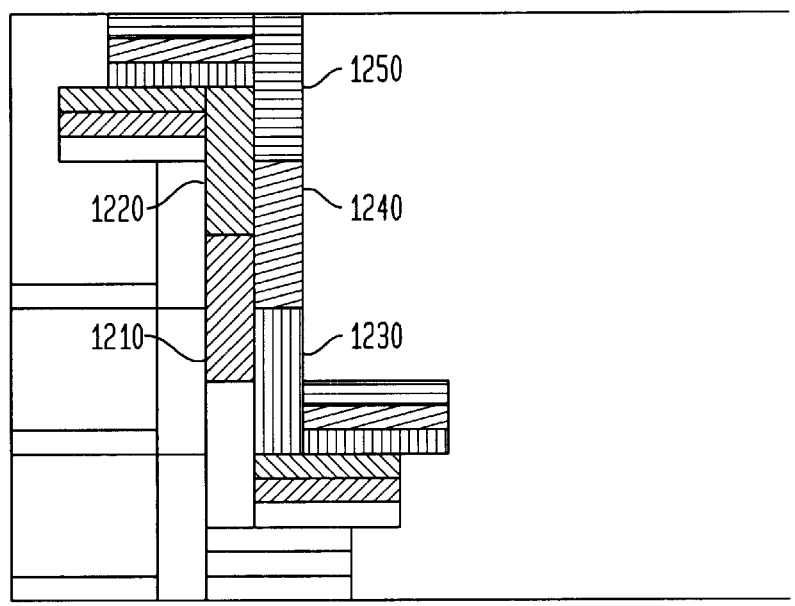
FIG. 12(d) illustrates the final schedule after the LS algorithm places the eighth and ninth composite multimedia objects in the schedule in FIG. 12(c).

FIG. 12(d) illustrates the final schedule after the LS algorithm places the eighth and ninth composite multimedia objects, 1240 and 1250 respectively, in the schedule in FIG. 12(c). FIG. 12(d) shows the final schedule obtained by LSB(3), which is in fact the optimal schedule. Further, note that LSB(3) had to backtrack only once during the whole scheduling process.

Until now, we have implicitly assumed that the composite multimedia objects to be scheduled are disjoint, in the sense that their component streams correspond to different data objects in the underlying repository. However, it is quite possible for distinct composite objects to have one or more components in common. Examples of such non-disjoint composite objects range from simple movie presentations, where the same video needs to be displayed with different soundtracks (e.g., in different languages), to complex news stories authored by different users, that can share a number of daily event clips.

In the presence of such common components, it is possible that exploiting stream sharing can lead to better schedules. The basic idea of "stream sharing" is that by appropriately scheduling non-disjoint composite objects, the streams delivering their common component(s) can be shared by all the composite object presentations. Clearly, stream sharing can reduce the aggregate resource requirements of a set of non-disjoint objects and it is easy to construct examples for which exploiting stream sharing can drastically improve the response time of a presentation schedule. On the other hand, stream sharing possibilities also increase the complexity of the relevant scheduling problems. Even simple cases of the problem (e.g., when all streams and composite objects are of unit length) give rise to hard scheduling problems that, to the best of our knowledge, have not been addressed in the scheduling literature. The problem becomes even more challenging when extra memory is available, since stream sliding and caching techniques can be used to increase the possibilities for stream sharing across composite objects. Finally, note that our stream sharing problem also appears to be related to the problem of exploiting common subexpressions during the simultaneous optimization of multiple queries. However, the use of a schedule makespan optimization metric (instead of total plan cost) makes our problem significantly harder to formulate and solve.

What has been described is merely illustrative of the application of the principles of the present invention. All United States patents and articles cited herein should be deemed to be incorporated by reference as to their entire contents in the event one of ordinary skill in the art wishes to obtain a more thorough understanding of the subject matter of the present invention. Other arrangements and methods can be implemented by those skilled in the art without departing from the spirit and scope of the present invention and the invention should only be deemed to be limited by the scope of the claims that follow.

We claim:

1. A method of scheduling the provision of composite multimedia objects, each comprising one or more continuous media streams of audio data, video data and other data, said continuous media steams of varying bandwidth requirement and duration comprising the steps of generating said composite multimedia objects from said continuous media streams, determining a run-length compressed form for each of said composite multimedia objects, scheduling at least two of said composite multimedia objects, wherein said at least two of said composite multimedia objects require a bandwidth in excess of a maximum allowable bandwidth constraint, determining a set of feasible starting points for each of said at least two of said composite multimedia objects, and determining the earliest starting point for each of said at least two of said composite multimedia objects such that said maximum allowable bandwidth constraint is not exceeded.

2. A method of scheduling the provision of composite multimedia objects as recited in claim 1 wherein said step of determining a run-length compressed form of said composite multimedia objects comprises the substeps of partitioning said composite multimedia objects into blocks of constant bandwidth requirement, and representing each said block by a pair representing 1) the constant bandwidth requirement over 2) a duration in time.

3. A method of scheduling the provision of composite multimedia objects as recited in claim 2 further comprising the step of scheduling two of said composite multimedia objects.

4. A method of scheduling the provision of composite multimedia objects as recited in claim 2 further comprising the step of scheduling a plurality of non-disjoint composite multimedia objects whereby said continuous media streams deliver one or more common components of said plurality of non-disjoint composite multimedia objects so that said common components can be shared by all said plurality of non-disjoint composite multimedia objects.

5. A method of scheduling the provision of composite multimedia objects as recited in claim 3 wherein said scheduling step comprises the step of using an algorithm to determine the earliest starting point for each of said two composite multimedia objects such that said maximum allowable bandwidth constraint is not exceeded.

6. A method of scheduling the provision of composite multimedia objects as recited in claim 3 wherein said scheduling step further comprises the steps of combining said two composite multimedia objects to form a partial original schedule, and if said partial original schedule is longer than the longest of said two composite multimedia objects, then
   (a) removing a specified number of said composite multimedia objects from said partial original schedule to create a remainder schedule,
   (b) combining said specified number of said composite multimedia objects to maximize the density of a resulting sequence,
   (c) combining said resulting sequence with said remainder schedule to form a revised schedule,
   (d) comparing the length of said revised schedule to the length of said partial original schedule, and
   (e) keeping the schedule with the shortest length as a new partial original schedule.

7. A method of scheduling the provision of composite multimedia objects as recited in claim 5 wherein said algorithm is FINDMIN.

8. A method of scheduling the provision of composite multimedia objects as recited in claim 5 wherein said algorithm is BITONIC-FINDMIN.

9. A method of scheduling the provision of composite multimedia objects as recited in claim 5 wherein said scheduling step further comprises the steps of combining said two composite multimedia objects to form a partial original schedule, and if said partial original schedule is longer than the longest of said two composite multimedia objects, then
   (a) removing a specified number of said composite multimedia objects from said partial original schedule to create a remainder schedule,
   (b) combining said specified number of said composite multimedia objects to maximize the density of a resulting sequence,
   (c) combining said resulting sequence with said remainder schedule to form a revised schedule,
   (d) comparing the length of said revised schedule to the length of said partial original schedule, and
   (e) keeping the schedule with the shortest length as a new partial original schedule.

10. A method of scheduling the provision of composite multimedia objects as recited in claim 1 wherein said step of generating said composite multimedia objects comprises the substeps of associating with each said continuous media stream a bandwidth requirement and a time, and stacking said continuous media streams to form said composite multimedia objects, said stacking of said continuous media streams being representative of a bandwidth requirement of said composite multimedia objects over time.

11. A method of scheduling the provision of composite multimedia objects as recited in claim 10 wherein said step of stacking said continuous media streams comprises the substeps of upsliding in time said continuous media streams to form monotonic composite multimedia objects.

12. A method of scheduling the provision of composite multimedia objects as recited in claim 10 wherein said step of stacking said continuous media streams comprises the substeps of upsliding in time said continuous media streams, and restacking of said continuous media streams such that a selected number of said continuous media streams are shielded by other said continuous media streams to form a monotonic composite multimedia object.

13. A method of scheduling the provision of composite multimedia objects as recited in claim 1 wherein provision comprises identifying storage (memory) requirements.

14. A method of scheduling the provision of composite multimedia objects as recited in claim 1 wherein provision comprises identifying at least one of disk and transmission bandwidth requirements.

15. A method of scheduling the provision of composite multimedia objects as recited in claim 1 wherein said other data comprises digital data representing still images, other images, animations, text, and program code data files.

16. A method of scheduling the provision of composite multimedia objects as recited in claim 1 wherein said other data comprises composite bit streams of audio and video data.

17. A method of scheduling the provision of composite multimedia objects, each comprising one or more continuous media streams of audio data, video data and other data, said continuous media streams of varying bandwidth requirement and duration comprising the steps of generating said composite multimedia objects from said continuous media streams, determining a run-length compressed form for each of said composite multimedia objects, determining minimal monotonic covers for said composite multimedia objects so as to minimize the volume of said minimal monotonic covers, scheduling at least two of said composite multimedia objects, wherein said at least two of said composite multimedia objects require a bandwidth in excess of a maximum allowable bandwidth constraint, determining a set of feasible starting points for each of said at least two of said composite multimedia objects, and determining the earliest stating point for each of said at least two of said composite multimedia objects such that said maximum allowable bandwidth constant is not exceeded.

18. A method of scheduling the provision of composite multimedia objects as recited in claim 17 further comprising the step of scheduling two of said minimal monotonic covers of said composite multimedia objects.

19. A method of scheduling the provision of composite multimedia objects as recited in claim 18 wherein said two composite multimedia objects require a bandwidth in excess of a maximum allowable bandwidth constraint wherein said scheduling step comprises the steps of determining a set of feasible starting points for each of said two composite multimedia objects, and determining the earliest starting point for each of said two composite multimedia objects such that said maximum allowable bandwidth constraint is not exceeded.

20. A method of scheduling the provision of composite multimedia objects as recited in claims 19 wherein said scheduling step further comprises the steps of combining said two composite multimedia objects to form a partial original schedule, and if said partial original schedule is longer than the longest of said two composite multimedia objects, then
 (a) removing a specified number of said composite multimedia objects from said partial original schedule to create a remainder schedule,
 (b) combining said specified number of said composite multimedia objects to maximize the density of a resulting sequence,
 (c) combining said resulting sequence with said remainder schedule to form a revised schedule,
 (d) comparing the length of said revised schedule to the length of said partial original schedule, and
 (e) keeping the schedule with the shortest length as a new partial original schedule.

21. A method of scheduling the provision of composite multimedia objects as recited in claim 18 wherein said scheduling step comprises the step of using an algorithm to determine the earliest starting point for each of said two composite multimedia objects such that said maximum allowable bandwidth constraint is not exceeded.

22. A method of scheduling the provision of composite multimedia objects as recited in claim 21 wherein said algorithm is FINDMIN.

23. A method of scheduling the provision of composite multimedia objects as recited in claim 21 wherein said algorithm is BITONIC-FINDMIN.

24. A method of scheduling the provision of composite multimedia objects as recited in claim 21 wherein said scheduling step further comprises the steps of combining said two composite multimedia objects to form a partial original schedule, and if said partial original schedule is longer than the longest of said two composite multimedia objects, then
 (a) removing a specified number of said composite multimedia objects from said partial original schedule to create a remainder schedule,
 (b) combining said specified number of said composite multimedia objects to maximize the density of a resulting sequence,
 (c) combining said resulting sequence with said remainder schedule to form a revised schedule,
 (d) comparing the length of said revised schedule to the length of said partial original schedule, and
 (e) keeping the schedule with the shortest length as a new partial original schedule.

25. A system for scheduling the provision of composite multimedia objects, each comprising one or more continuous media streams of audio data, video data and other data, said continuous media streams of varying bandwidth requirement and duration said system comprising a multimedia database server, said multimedia database server comprising
 means for generating said composite multimedia objects from said continuous media streams,
 means for determining a run-length compressed form for each of said composite multimedia objects,
 means for scheduling at least two of said composite multimedia objects, wherein said at least two of said composite multimedia objects require a bandwidth in excess of a maximum allowable bandwidth constraint, means for determining a set of feasible starting points for each of said at least two of said composite multimedia objects, and means for determining the earliest starting point for each of said at least two of said composite multimedia objects such that said maximum allowable bandwidth constraint is not exceeded.

26. A system for scheduling the provision of composite multimedia objects as recited in claim 25 wherein said multimedia database server further comprises means for partitioning said composite multimedia objects into blocks of constant bandwidth requirement, and means for representing each said block by a pair representing the constant bandwidth requirement over a duration of time.

* * * * *